Jan. 21, 1958 G. I. KOONS 2,820,458

RECORD CARD

Filed May 12, 1952 2 Sheets-Sheet 1

INVENTOR.
GEORGE I. KOONS

BY

Mellin and Hanscom

ATTORNEYS

Jan. 21, 1958 G. I. KOONS 2,820,458

RECORD CARD

Filed May 12, 1952 2 Sheets-Sheet 2

INVENTOR.
GEORGE I. KOONS

BY

Mellin and Hanscom

ATTORNEYS

United States Patent Office 2,820,458
Patented Jan. 21, 1958

2,820,458

RECORD CARD

George I. Koons, Athens, Ohio, assignor, by mesne assignments, to Royal McBee Corporation, a corporation of New York Application May 12, 1952, Serial No. 287,301

5 Claims. (Cl. 129—16.1)

This invention relates to cards or other flat bodies of sheet material adapted to be sorted or classified. More particularly, the invention relates to marginally perforated cards, sheets or checks and the like which may be sorted, separated or classified for accounting or statistical purposes, particularly cards that can be sequentially sorted.

There is an ever increasing demand for the provision of a record card on which more information can be coded along the margins of such card without increasing the size thereof. In previous cards, the fields have been three, four or five perforations wide.

It is a main object of the present invention to provide a record card having a field of only two perforations wide, and particularly a field containing only three perforations, two perforations in an outer row and one in an inner row; to provide a method of notching such a field to enable a stack of such cards to be sequentially sorted with no more passes of a sorting needle than is required with cards in current use; and to provide a special sorting needle to enable sorting of the cards.

Various other objects will be apparent from the following description taken in connection with the accompanying drawings wherein.

Figure 1:
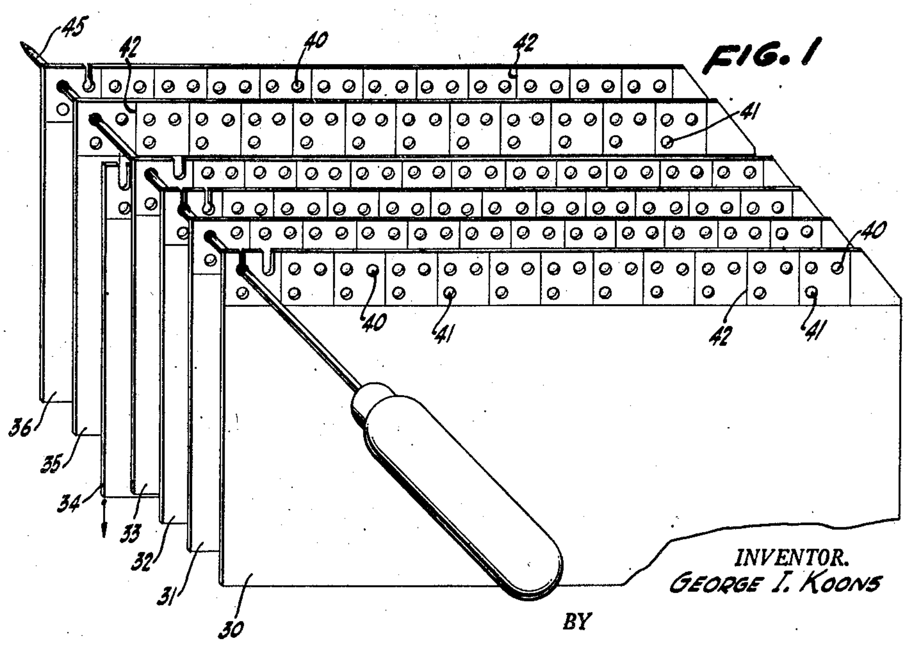
Fig. 1 is a view of a stack of cards embodying the concepts of the present invention and having a special needle extending through one row of aligned perforations, the cards being shown in exaggerated spaced relationship for purposes of clarity of illustration.

Referring to the accompanying drawings wherein similar reference characters designate similar parts throughout, a stack of cards embodying the concepts of the present invention is disclosed in Fig. 1, the cards being designated by the reference numerals 30 through 36, reading from front to back. Although the cards shown have coded areas along only one margin of each, similar fields can be provided on other margins thereof, or different types of fields can be provided on the cards on other margins thereof, or on the same margins on which fields embodying the concepts of the present invention appear.

In general, the record card disclosed has an outer row of perforations generally entitled 40 parallel to a card edge, the top margin in the illustration shown, and an inner row of perforations 41 spaced closely adjacent to the outer row. The card is provided with lines 42 which divide the perforations into fields of only three perforations each, two in the outer row and one in the inner row. Each inner row perforation is disposed in alignment, in a direction perpendicular to the adjacent card edge, with the left-hand outer row perforation of its field. Reading from left to right, each field bears the numerical indicium "1" next to the right-hand outer row perforation, the numerical indicium "3" next to the left-hand outer row perforation, and the numerical indicium "9" next to the inner row perforation.

In order to be able to sequentially sort these small fields, the fields are specially notched with two kinds of notches, a wide notch and a narrow notch, and are sorted by the use of a special flat bladed sorting needle, which has a blade width slightly less than that of a wide notch but greater than that of a narrow notch, and a blade thickness slightly less than that of a narrow notch. It is apparent that when the needle blade is arranged horizontally, it may pass through a wide notch but not a narrow notch and thus effect a separation of cards having their fields wide notched, in the perforations through which the needle extends, from the cards having the corresponding perforations narrow notched. When the needle blade is arranged vertically, that is turned 90 degrees, it may pass through a narrow notch but, of course, not through an unnotched field, to effect a further separation.

By a combination of wide and narrow notches a field only two perforations wide and two perforations deep (three perforations in all) can be coded to indicate classifications from "0" to "12."

Cards embodying the concepts of the present invention can be adapted for coding as a digit field, i. e., "0" to "9" or coded as an isolated field, in this case "0" to "12." Coding and sorting for digit fields will be first explained.

Referring to Figs. 2 to 11, Fig. 2 shows a field left blank to indicate a "0" classification.

Figure 2:
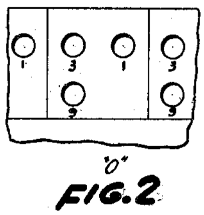
Figs. 2 through 14 are fragmentary views of a card edge, showing fields of a record card embodying the concepts of the present invention coded to indicate classifications from "0" to "12" respectively.
Figure 3:
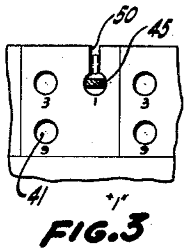

To code a field to indicate a "1" classification (whether the field is so located to represent a classification of "1," "10," "1000," et cetera, is not at present particularly important), the "1" perforation is notched to the card edge by a narrow notch, given the reference numeral 50, see Fig. 3.

Figure 4:
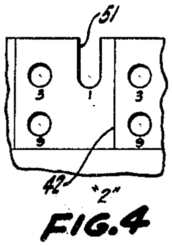

A field is coded to indicate a "2" classification, as shown in Fig. 4, by having its "1" perforation notched to the card edge by a wide notch, given the reference numeral 51.

Figure 5:
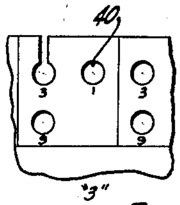

A field is coded to indicate a "3" classification, as shown in Fig. 5, by having its "3" perforation narrow notched to the card edge.

Figure 6:
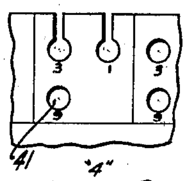

A field is coded to indicate a "4" classification, as shown in Fig. 6, by having its "1" and "3" perforations narrow notched to the card edge.

Figure 7:
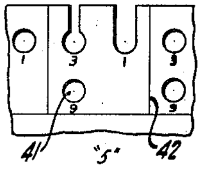

A field is coded to indicate a "5" classification, as shown in Fig. 7, by having its "1" perforation wide notched to the card edge and its "3" perforation narrow notched to the card edge.

Figure 8:
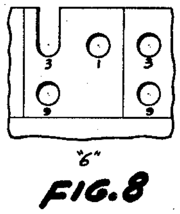

A field is coded to indicate a "6" classification, as shown in Fig. 8, by having its "3" perforation wide notched to the card edge.

Figure 9:
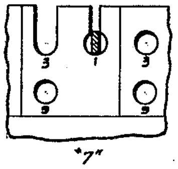

A field is coded to indicate a "7" classification, as shown in Fig. 9, by having its "3" perforation wide notched to the card edge and its "1" perforation narrow notched to the card edge.

Figure 10:
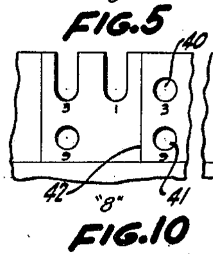

A field is coded to indicate an "8" classification, as shown in Fig. 10, by having its "3" and "1" perforations wide notched to the card edge.

Figure 11:
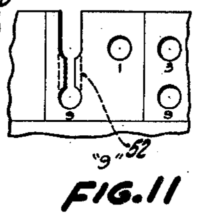

A field is coded to indicate a "9" classification, as shown in Fig. 11, by having its "3" perforation wide notched to the card edge and its "9" perforation narrow notched into the "3" perforation. However, for digit fields, the "9" perforation can be wide notched to the card edge, as indicated in dotted lines at 52.

With cards notched as above described, it is apparent that if the flat sorting needle 45 is turned horizontal such as disclosed in Fig. 3, and inserted through the "1" perforations and lifted, the "1" coded cards will not drop, although the "2" coded cards (in the fields through which the needle is inserted) will. On the other hand, if the needle is turned vertically as shown in dot-dash lines in Fig. 3, the "1" coded cards, in the penetrated fields, will drop.

Referring to Fig. 1, it is evident that the flat sorting needle 45 has been inserted with its blade turned horizontally, through the aligned "3" perforations in the extreme left-hand aligned fields. It is also evident that first card 30 has been coded, in the field through which the needle extends, for indicating a "5" classification; that the corresponding field of card 31 has been left blank to indicate a "0" classification; that the corresponding field of card 32 has been coded to indicate a "4" classification; that the corresponding field of card 33 has been coded to indicate a "2" classification; that card 34 had its corresponding field coded to indicate a "6" classification; that card 35 has its corresponding field left blank to indicate a "0" classification, and that card 36 has its corresponding field coded to indicate a "1" classification.

Fig. 1 shows the parts as if the needle 45 had been raised or, conversely the support for the cards had been dropped, so that all the cards having their fields, through which the needle extends, wide notched from their "3" perforations to the card edge will drop, it being apparent that card 34 is the only one having its "3" perforation wide notched, and therefore is the only card that will drop. However, when the needle is turned 90 degrees to dispose the blade thereof vertically, the cards 30 and 32 will drop, since the needle will pass through the narrow notched "1" perforations therein.

Reference is now made to Figs. 15 through 25, which depict diagrammatically the manner of sequential sorting of a stack of cards. The block in Fig. 15 indicates a stack of unsorted cards which have been purposely arranged in inverse order to that desired, i. e., "9" to "0", instead of "0" to "9", to clearly show how sequential sorting is effected. The remaining blocks in the other figures depict how the cards are progressively sorted and rearranged. It is assumed that the observer is looking down on the top edges of the stack of cards, and the digits "1" through "9" are intended to indicate one or more cards bearing these classifications. The unsorted cards are in practice intermixed, but the present showing is believed to be an effective demonstration.

Figures 15, 16, 17, 18, 19, 20, 21, 22, 23, 24, 25:
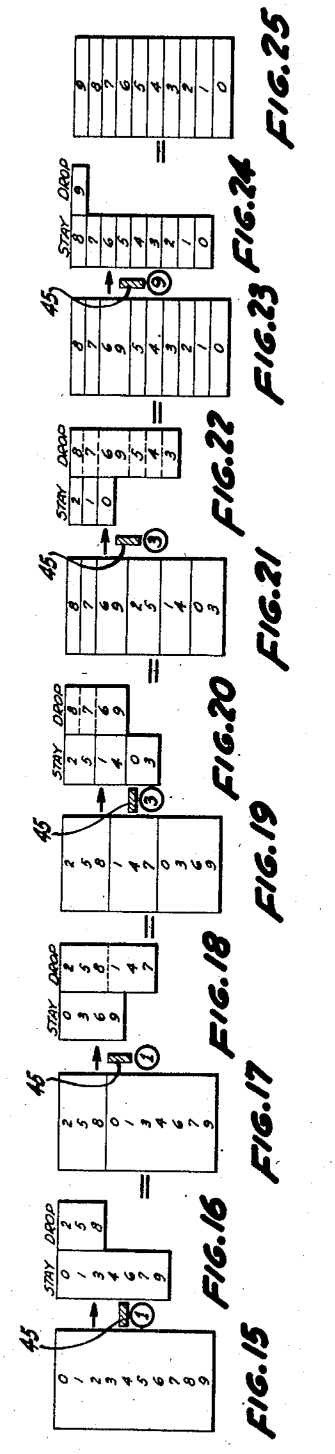
Figs. 15 through 25 show diagrammatically the manner of sequentially sorting a stack of cards embodying the concepts of the present invention.

Beginning with Fig. 15, the needle 45 is run through the aligned "1" perforations, in the particular aligned fields being sorted, with its blade turned to a horizontal position so that the "0", "1", "3", "4", "6", "7" and "9" cards stay or remain on the needle (the horizontally disposed needle blade being unable to pass through the narrow notches or the unnotched marginal card material), whereas the "2", "5" and "8" cards will drop (because their "1" perforations are wide notched), see Fig. 16. The arrows indicate that the dropped cards are placed behind the cards which have stayed on the needle, so that the stack is then disposed in the relationship shown in Fig. 17.

Leaving the needle threaded through the cards, the needle blade is turned to its vertical position, so that when lifted, the "0", "3", "6" and "9" cards stay on the needle (being unnotched in this zone), whereas the "2", "5" and "8", and the "1", "4" and "7" cards will drop. The horizontal dotted line in Fig. 18, in the drop section, indicates that the "2", "5" and "8" cards will be disposed behind the "1", "4" and "7" cards, because of the relative dispositions of these groups of cards as shown in Fig. 17. When the dropped cards have been moved to the back of the stack, the cards of the stack will be disposed in the relative positions shown in Fig. 19.

The needle blade is then turned horizontally and run through the "3" perforations (of the same fields) and lifted to effect a separation. It will be noted in Fig. 20, that the "6", "9", "7" and "8" cards drop, and again the dotted horizontal lines indicate the disposition of the dropped cards relative to one another, and it is evident that the "8" cards will be behind the "7" cards, and the "7" cards behind the "6" and "9" cards. When the dropped cards are arranged behind the cards which have stayed, the disposition of the cards will be that as shown in Fig. 21.

Leaving the needle threaded through the cards, the needle blade is turned vertically and lifted so that the "3", "4", "5", "6" and "9", "7" and "8" cards will drop, as shown in Fig. 22, and will be disposed in relationship shown by the dotted lines, i. e., the "3" cards first, the "4" cards second, etc. The "0", "1" and "2" cards will remain, and as is apparent, they will be in numerical ascending order. When the dropped cards in Fig. 22 have been arranged behind the stack, as shown in Fig. 23, it is apparent that the cards of the stack are arranged in numerical order with the sole exception of the "9" cards.

To effect a separation of the "9" cards, the needle blade is turned vertically, run through the "9" perforations and lifted to effective dropping of only the "9" cards, which are then arranged at the rear of the stack, as shown in Fig. 25, wherein it is apparent that the cards of the stack are arranged in correct sequential order. As previously mentioned, if a digit system for a field is contemplated, the "9" perforation can be wide or narrow notched to the card edge. If it is wide notched, it is obviously immaterial whether the needle is run through the "9" perforations in upright or horizontal position.

It is frequently desirable to be able to provide so-called isolated fields on a card, that is, a field which bears no particular relationship to an adjacent or other field. Such a field can be provided for indicating information such as the months of the year. The field already described is capable of being used as an isolated field by proper coding to indicate classifications from "0" to "12". The coding of the cards is carried out exactly as previously described, except that in order to notch a card to indicate a "9" classification, it is mandatory that the "9" perforation be narrow notched into the "3" perforation as shown in full lines in Fig. 11, and, of course, the "3" perforation wide notched to the card edge.

Figure 12:
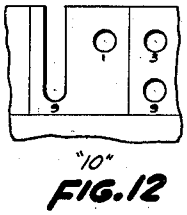
Figure 13:
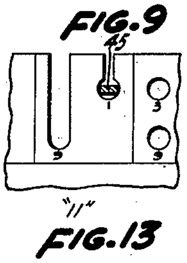
Figure 14:
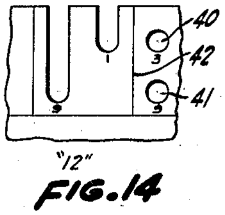

To code a field to indicate a "10" classification, its "9" perforation is wide notched to the card edge, as shown in Fig. 12; to code a field to indicate an "11" classification, its "9" perforation is wide notched to the card edge and its "1" perforation is narrow notched to the card edge, as shown in Fig. 13; to code a field to indicate a "12" classification, its "9" and "1" perforations are wide notched to the card edge as shown in Fig. 14.

A sequential sort of cards having these isolated fields thereon is effected in the same manner as described with respect to the digit fields previously described, except that it is mandatory that the last sort previously described be made with the needle blade turned to its vertical position and, thereafter, the needle turned to its horizontal position to effect a separation of the "10," and "11" and "12" cards, which are placed at the back of the stack. The "10," "11" and "12" cards will have been previously correctly arranged in the proper order by the previous sorting procedure, but will be incorrectly located in the stack.

It is apparent that by the present invention a classification card has been provided having a narrower and shallower field than heretofore thought possible. When a stack of these cards are notched according to the teachings of the present invention they can be readily sequentially sorted, in no more operations than conventionally required with previous cards, by utilizing the special needle provided by the present invention.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A device for coding, sorting and segregating record cards in accordance with a numerical classification comprising a plurality of record cards each having a plurality of coding fields defined along coding edges of the cards, a group of coding apertures in each field, each group consisting of three apertures arranged with two in an outer row in spaced parallel relation to the coding edge and one in an inner row aligned with one of the outer row apertures at right angles to the coding edges, and notches extending from the coding edge of each card to selected apertures within selected fields for coding each card with respect to a desired classification, the width and the positioning of the notches being varied to indicate different classifications.

2. A device for coding, sorting and segregating record cards in accordance with a numerical classification comprising a plurality of record cards each having a plurality of coding fields defined along coding edges of the cards, a group of coding apertures in each field, each group consisting of three apertures arranged with two in an outer row in spaced parallel relation to the coding edge and one in an inner row aligned with one of the outer row apertures at right angles to the coding edges, indicia applied to the card in association with and separately identifying the apertures, and notches extending from the coding edge of each card to selected apertures within selected fields for coding each card with respect to a desired classification, the width and the positioning of the notches being varied to indicate different classifications.

3. A device for coding, sorting and segregating record cards in accordance with a numerical classification comprising a plurality of record cards each having a plurality of coding fields defined along coding edges of the cards, a group of coding apertures in each field, each group consisting of three apertures arranged with two in an outer row in spaced parallel relation to the coding edge and one in an inner row aligned with one of the outer row apertures at right angles to the coding edges, indicia consisting of the numerals "1," "3" and "9" applied to the card in association with and separately identifying the apertures with the numerals "1" and "3" identifying the outer row apertures and the numeral "9" identifying the inner row apertures aligned with the outer row aperture identified by the numeral "3," and notches extending from the coding edge of each card to selected apertures within selected fields for coding each card with respect to a desired classification, the width and the positioning of the notches being varied to indicate different classifications.

4. In a device for coding, sorting and segregating record cards in accordance with a numerical classification a record card having a coding field defined upon a coding edge of the card and provided with a group of coding apertures therein consisting of a pair of outer coding apertures spaced from each other and from the coding edge and an inner aperture spaced inwardly from and aligned with one of the outer apertures, indicia applied to the card in association with the apertures and consisting of the numerals "3" and "9" identified with the aligned outer and inner apertures respectively and the numeral "1" associated with the other aperture, the coding edge being notched to classify the card in accordance with a code in which a narrow notch to a selected outer aperture indicates a numerical value equal to the indicia number of the aperture, a wide notch to an outer row aperture indicates a numerical value double the value of the indicia number, a notch to the inner aperture indicates the numerical value equal to its indicia, and pairs of notches indicate additive values of the indicia numbers.

5. In a method of sorting and segregating record cards having apertures arranged in groups along coding edges of the cards and having formed therein narrow notches to selected apertures in selected fields and substantially wider notches to other selected apertures in selected fields for classifying the cards in accordance with the width and arrangement of notches, passing sorting means through registering apertures occupying a selected position in corresponding fields, said sorting means having a narrow dimension permitting relative movement of the sorting means from the apertures along both wide and narrow notches formed thereto and having a wider dimension permitting relative movement of the sorting means only along wide notches formed thereto, turning said sorting means to present a desired dimension to the notches, and separating cards retained upon the sorting means from those separable therefrom by relative movement of the sorting means and cards along the notches.

References Cited in the file of this patent

UNITED STATES PATENTS

| | | |
|---|---|---|
| 1,702,994 | Buckeridge | Feb. 19, 1929 |
| 2,289,380 | Nevin | July 14, 1942 |
| 2,331,471 | Holleck | Oct. 12, 1943 |
| 2,450,442 | Nyman | Oct. 5, 1948 |
| 2,690,751 | Feiertag | Oct. 5, 1954 |